Figure 1:
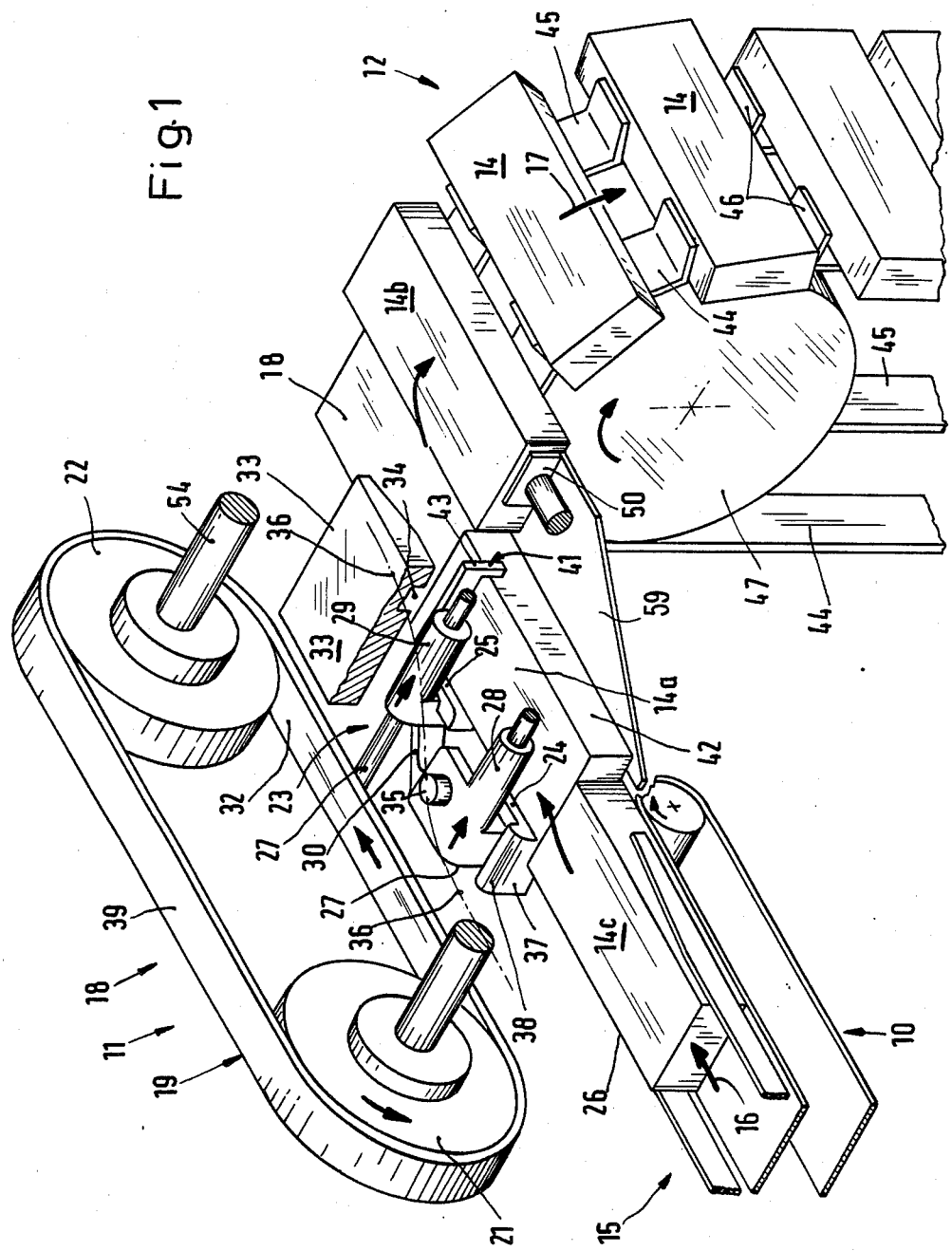

United States Patent [19]

Focke et al.

[11] Patent Number: 4,678,074

[45] Date of Patent: Jul. 7, 1987

[54] APPARATUS FOR SEPARATING OBJECTS (PACKAGES) FROM A CONTINUOUS ROW OF OBJECTS

[75] Inventors: Heinz Focke, Verden; Hugo Mutschall, Kirchlinteln, both of Fed. Rep. of Germany

[73] Assignee: Focke and Co., Fed. Rep. of Germany

[21] Appl. No.: 818,917

[22] Filed: Jan. 15, 1986

Related U.S. Application Data

[63] Continuation of Ser. No. 515,420, Jul. 20, 1983, abandoned.

[30] Foreign Application Priority Data

Aug. 17, 1982 [DE] Fed. Rep. of Germany ....... 3230533

[51] Int. Cl.⁴ .............................................. B65G 47/26
[52] U.S. Cl. .................................................. 198/457
[58] Field of Search ..................... 198/456, 457, 469.1, 198/470.1, 474.1, 477.1, 440, 598, 725, 728, 698, 699

[56] References Cited

U.S. PATENT DOCUMENTS

| | | | |
|---|---|---|---|
| 2,651,442 | 9/1953 | Malhiot | 198/456 X |
| 3,900,096 | 8/1975 | Nack et al. | 198/457 |
| 4,519,495 | 5/1985 | Bolli | 198/456 X |

FOREIGN PATENT DOCUMENTS

| | | | |
|---|---|---|---|
| 255425 | 1/1913 | Fed. Rep. of Germany | 198/440 |
| 2642094 | 3/1978 | Fed. Rep. of Germany | 198/456 |

*Primary Examiner*—Joseph E. Valenza
*Assistant Examiner*—Jonathan D. Holmes
*Attorney, Agent, or Firm*—Sughrue, Mion, Zinn, Macpeak, and Seas

[57] ABSTRACT

Positionally correct transfer of elongated objects, particularly cigarette cartons, to a packing machine for producing large packages with re-orientation, in relation to the feed, in close succession, is achieved by transversely pushing the successive front objects (19) along a conveyance path by transversely movable pushers (33) or (56). The pushers separate the front object (14a) and feed it for side entry to an endless chain discharge conveyor (12) at the point where the endless chain conveyor rotates about a sprocket.

18 Claims, 8 Drawing Figures

APPARATUS FOR SEPARATING OBJECTS (PACKAGES) FROM A CONTINUOUS ROW OF OBJECTS

This is a continuation, of application Ser. No. 515,420, filed July 20, 1983, abandoned.

DESCRIPTION

The invention relates to an apparatus for separating the object which is at the moment in question at the front of a row of objects closely following one another, particularly packages (so-called cigarette cartons), by transversely pushing off at least the front object by means of transverse pushers which are disposed on a rotating conveyor and which laterally take hold of one object at a time and, as the conveying continues, push it away transversely to the feed conveying direction.

The invention deals with the general aim of separating and orienting objects, particularly packages delivered in close succession by a manufacturing machine (packing machine), in such a manner that they are given a relative position suitable for further processing, particularly for the production of large packets.

In one known apparatus for separating objects in a continuous row the transverse pushers are disposed on a plate, which rotates in a horizontal plane, in the region of the outer periphery. In this case each transverse pusher is angular in shape. One arm serves as a transverse pusher member, while the other arm, pointing transversely to the conveying direction, serves as a stop for the following object or objects. The transverse pushers formed in this manner are moved one after the other into the path of movement of the objects being fed, through the rotation of the plate. The front object is thus taken hold of by one of the angular transverse pushers, and as the result of the further rotation of the plate is moved laterally while a continuous feed movement in the conveying direction is maintained. A discharge conveyor extends tangentially to the plate and takes over and carries away by means of drivers the transversely displaced objects.

The kinematics of the transverse pushers is disadvantageous, because of the movement along a circular path, for the problem indicated above. In comparison with the size of the plate (its diameter), only relatively small transverse movement amplitudes are possible. Moreover, the transverse displacement has to be made along a relatively short conveyance path, namely along a small angle of rotation of the plate. As a result, correct transverse displacement and separation of elongated (right parallelepipedic) objects is difficult or impossible. In particular, the processing for packing purposes of cigarette cartons would be impracticable, because of their length, with this known apparatus. (German Patent No. 27 35 364).

The problem underlying the invention is that of further developing and improving comparable known apparatus of the kind first specified above. In particular, the invention seeks to permit the movement of the objects, for their separation, in optimum manner for the conveying or packing operation, while taking into account the shape and, above all, the size of the objects.

For the purpose of solving this problem the apparatus according to the invention is characterised in that the transverse pushers are adapted to move along a substantially linear conveyance path at least during the displacement movement transversely to the feed conveying direction.

For this purpose the transverse pushers are preferably disposed on a rotating endless conveyor (package-conveyor-band, belt or chain conveyor), in such a manner that the transversely directed displacement movement takes place during the movement of the transverse pushers over one side of the endless conveyor.

In the apparatus according to the invention the transverse displacement of the objects, and hence their separation, can be effected over a longer part of their conveyance path. In addition, it is possible to determine the phase of the transverse displacement and therefore the part of the movement as far as the separation of the front object from the following objects, namely by means of a corresponding length and/or conformation of the endless conveyor for the transverse pushers.

Various solutions are possible for the concrete construction of the transverse pushers and of the endless conveyor for the latter. Thus, the transverse displacement can be achieved by the inclination of the endless conveyor in relation to the feed conveying direction of the objects. In this solution the endless conveyor (belt conveyor) is expediently disposed above the path of movement of the objects, in such a manner that the transverse pushers take hold of the objects from above in the region of a bottom side of the belt conveyor, and as the result of the conveying movement of the belt conveyor displace them transversely, while maintaining the original conveying movement.

A particularly, advantageous solution provides a transverse pusher belt extending substantially in the feed conveying direction. A plurality of transverse pushers are disposed on this belt, spaced apart from one another. In the region of one side of the belt, particularly in the region of a lower side, the transverse pushers come into engagement with the objects, while the transverse movement and hence the separation is effected through relative movement of the transverse pushers in relation to the transverse pusher belt. In this solution the kinematics of the transverse pushers can be adapted in optimum manner to a desired movement characteristic and to the size and shape of the objects, since the function of the transverse pushers is independent of the movement of the endless conveyor.

In the case of this solution the transverse pusher belt expediently consists of two parallel belts which extend at a distance from one another and are connected together by transversely directed carrier rods. On this belt the transverse pushers are mounted for sliding movement. By means of special guide members, preferably a stationary slotted guide, the path of movement of the transverse pushers is determined during the conveying movement of the transverse pusher belt. A unit consisting of the side belts of the transverse pusher belt and of the transverse pushers, including the slotted guide, is, according to a further proposal of the invention, adapted to be raised, in particular by pivoting upwards.

The objects separated from the continuous row and displaced transversely are, according to the invention, fed to a discharge conveyor, which is disposed for conveying in a vertical plane, transversely to the feed conveying direction. The objects are fed to this discharge conveyor in the region of a reserval point of the conveyor belts, and are conveyed by it in the downward direction. A (horizontal) transfer conveyor running in a downwardly offset plane then follows the discharge conveyor.

Figure 2:
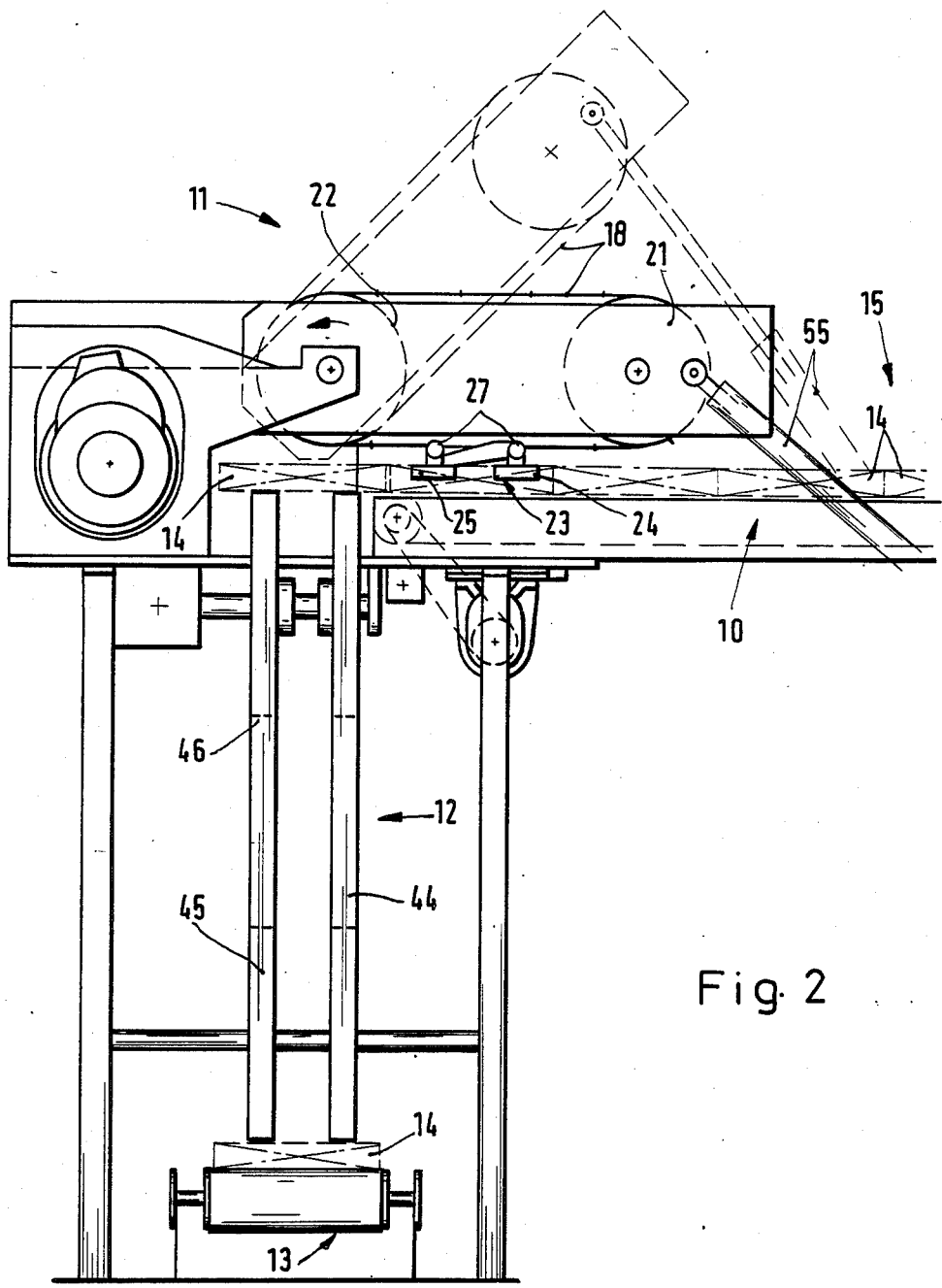
Figure 3:
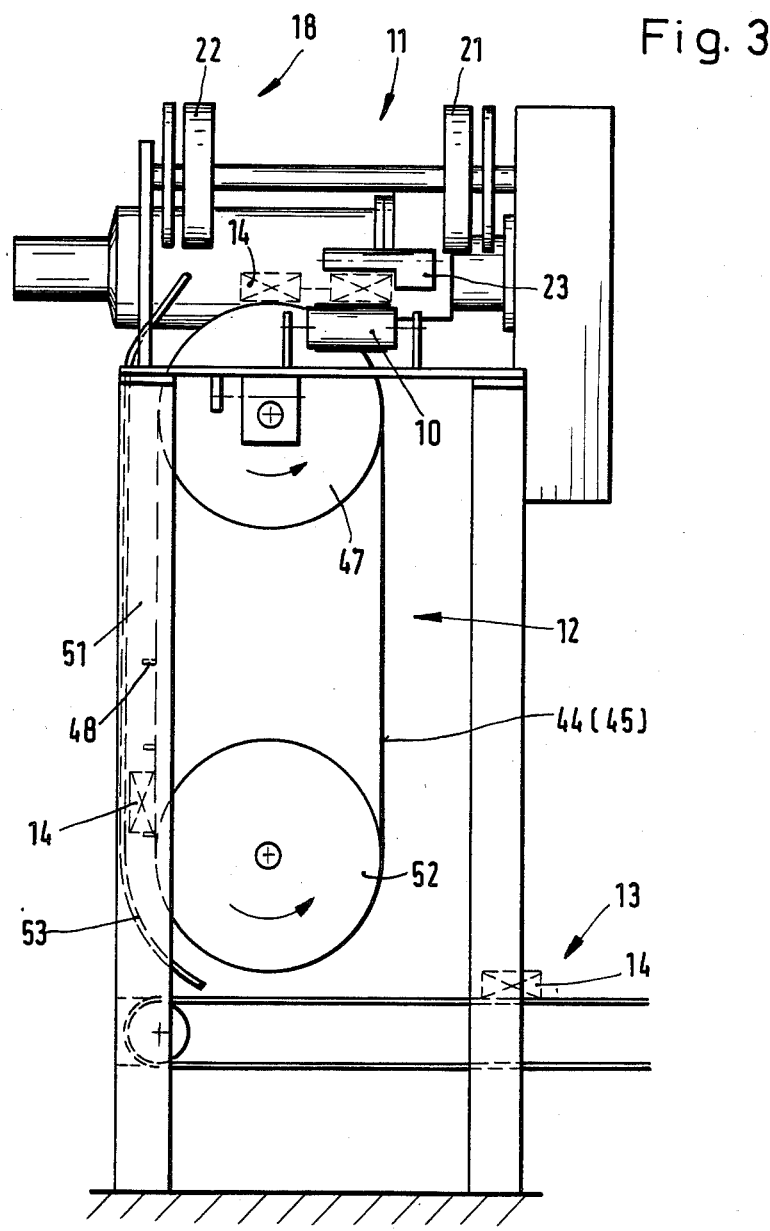
Figure 4:
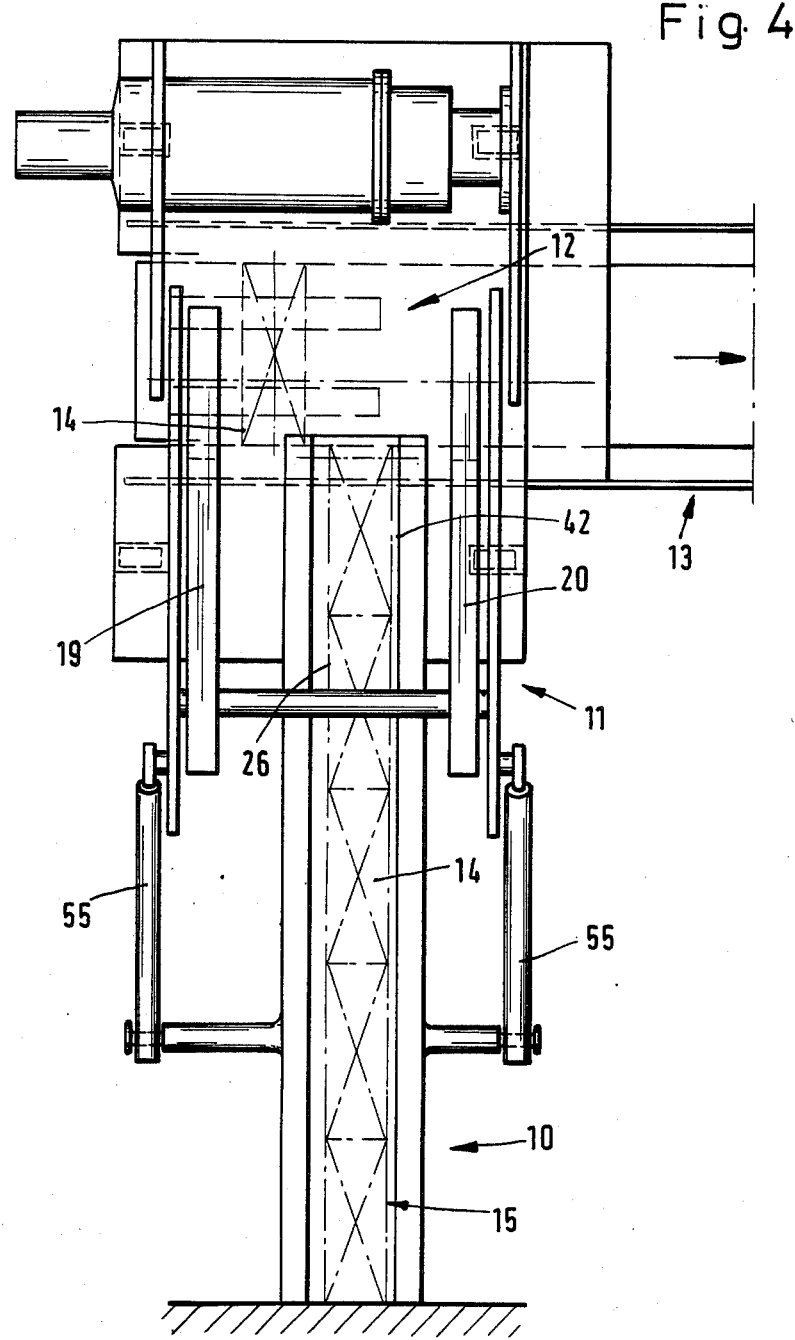
Figure 5:
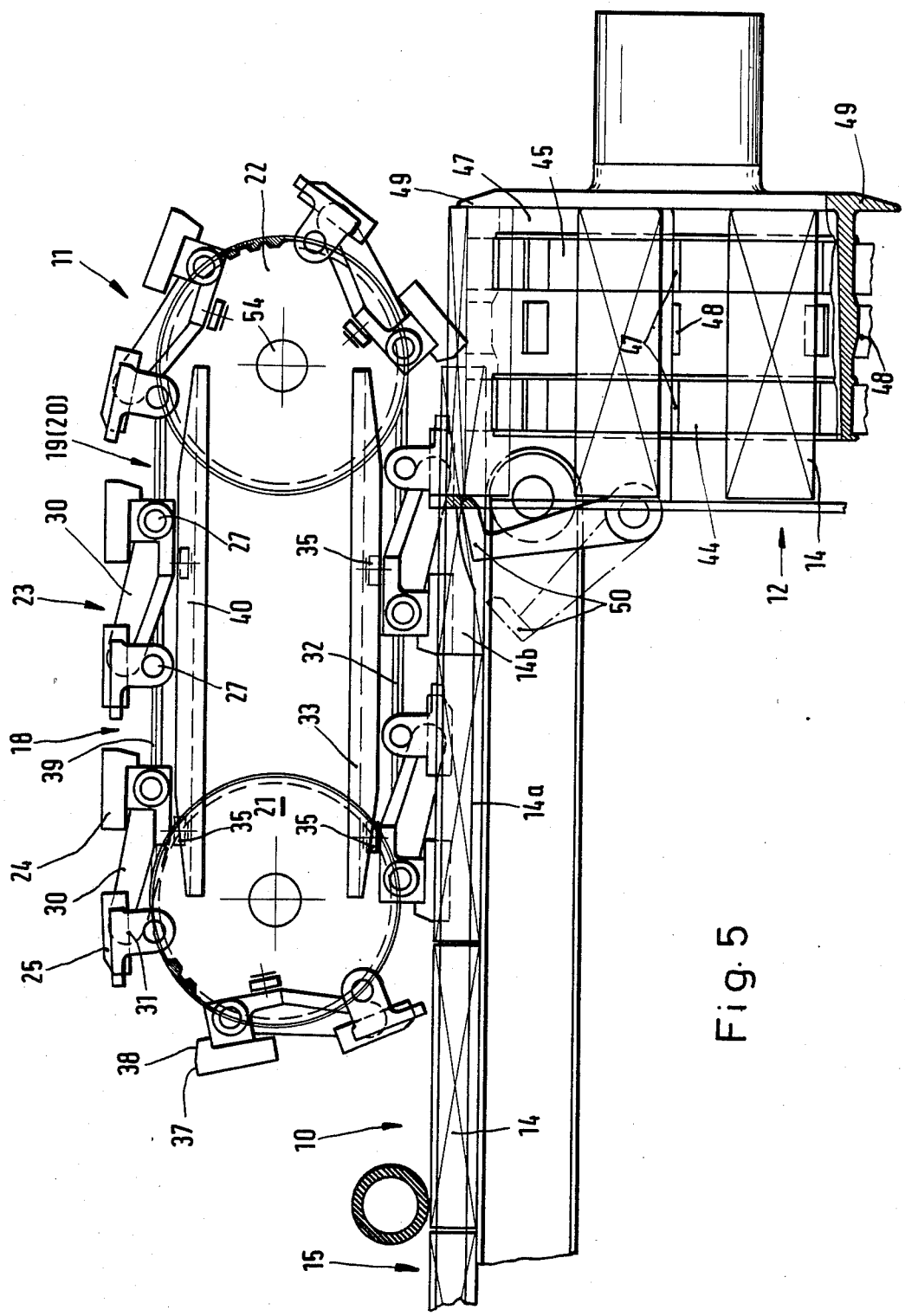
Figure 6:
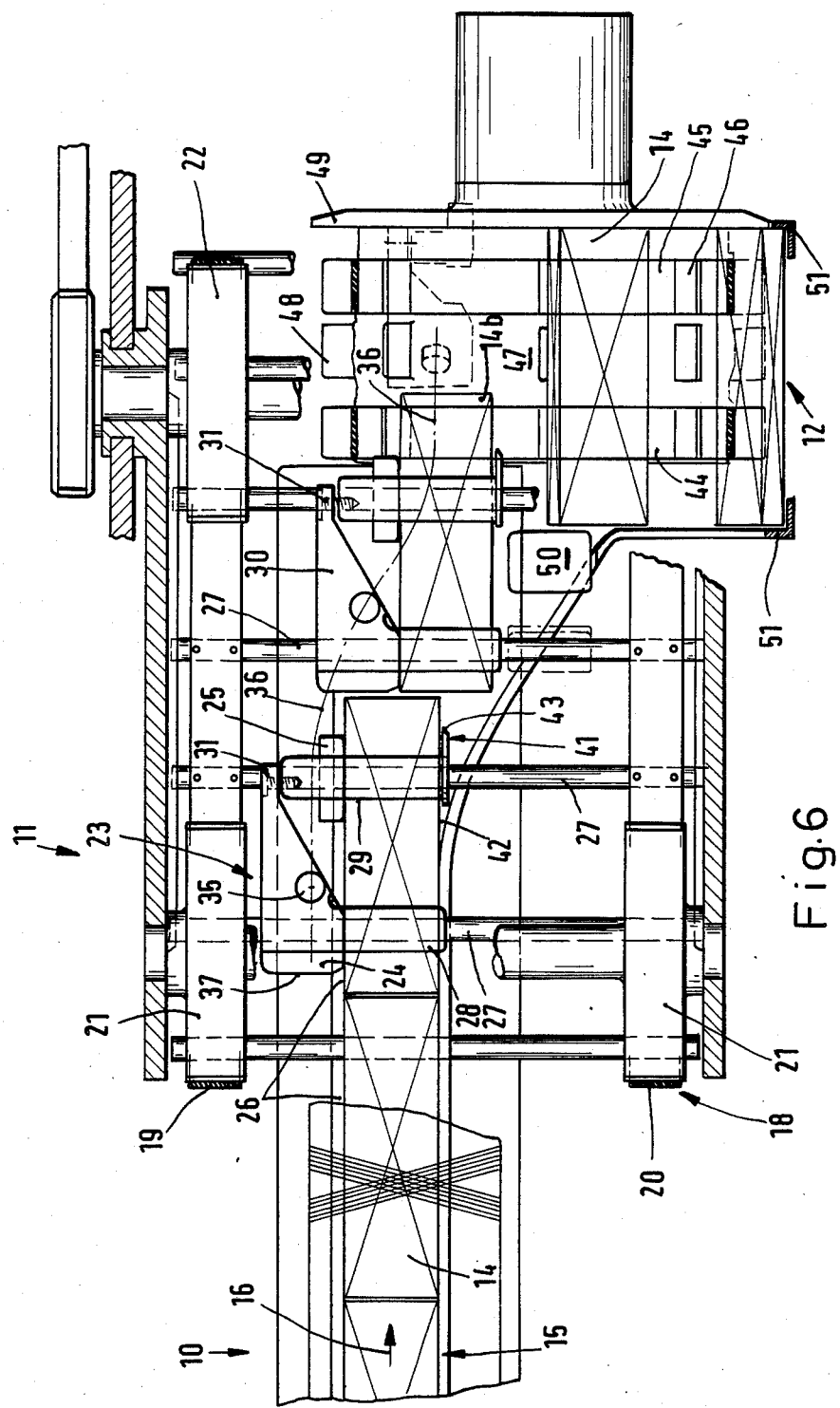
Figure 7:
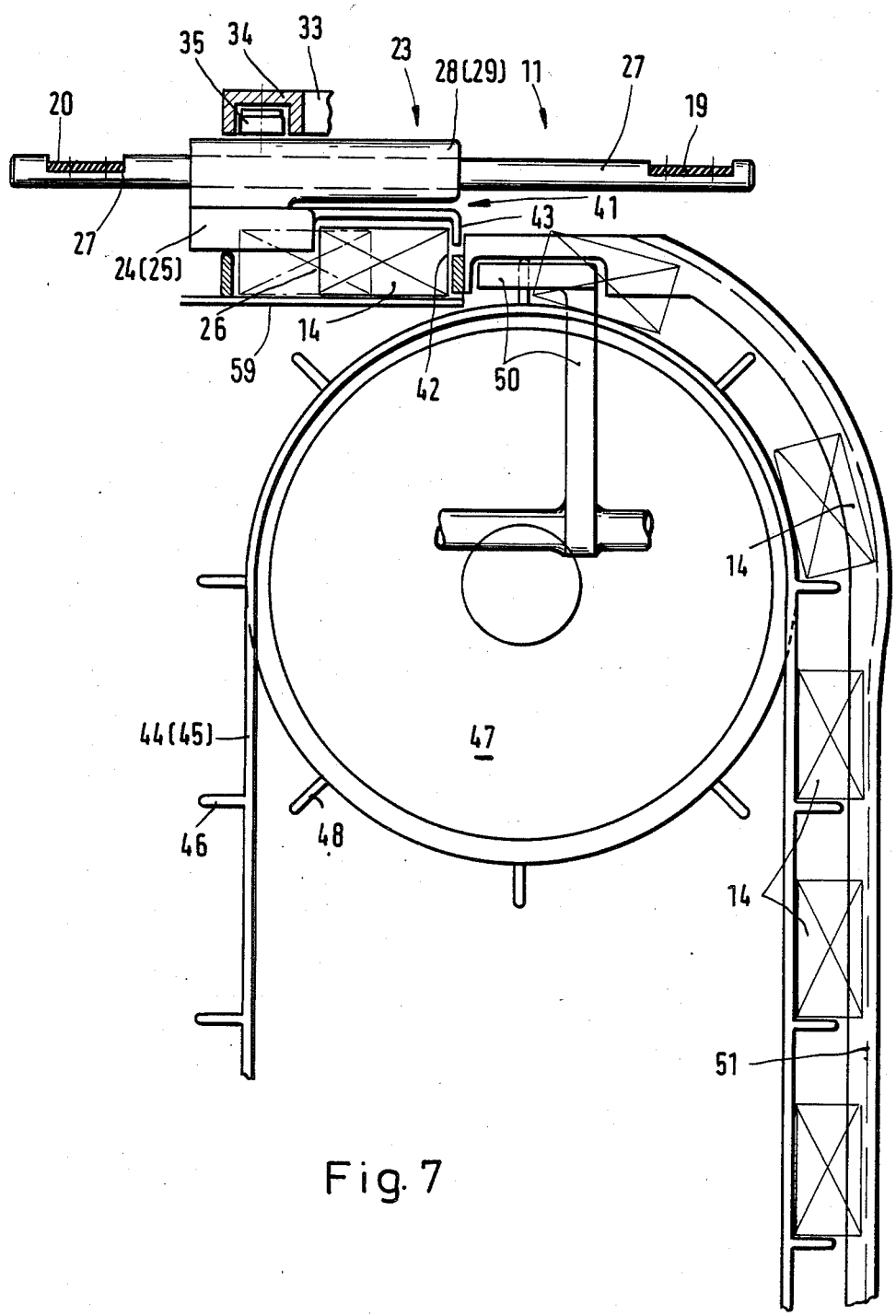
Figure 8:
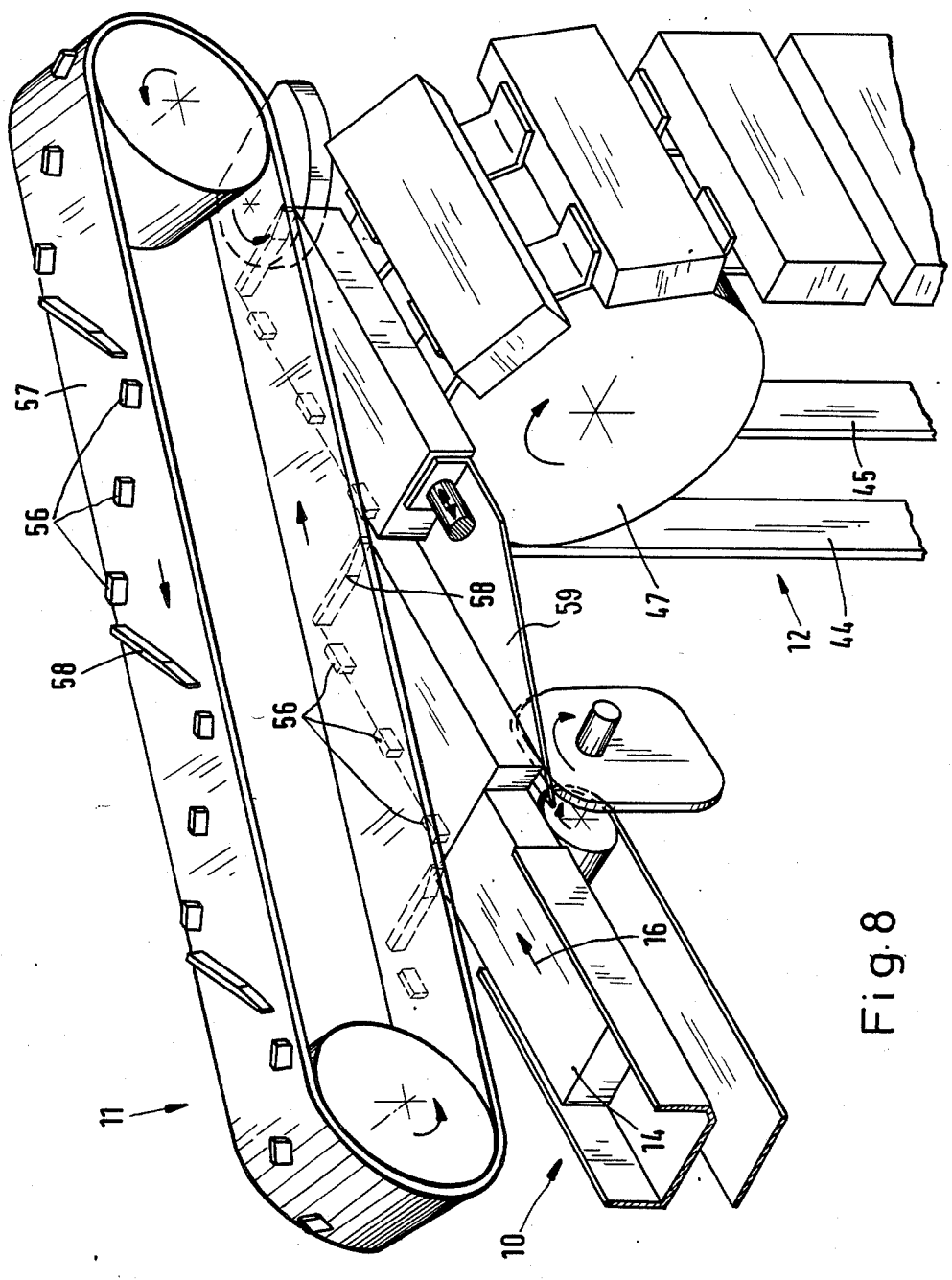

Further details are explained more fully below with reference to the examples of embodiment of the invention illustrated in the drawings, in which:

FIG. 1 shows in perspective an important part of an apparatus for separating objects, omitting constructional details, FIG. 2 shows on a smaller scale a part of the apparatus of FIG. 1 in side view, FIG. 3 shows an end view of the arrangement shown in FIG. 2, turned 90°, FIG. 4 is a plan view corresponding to the arrangement shown in FIGS. 2 and 3, FIG. 5 shows a side view of details of the apparatus on a scale corresponding approximately to FIG. 1, FIG. 6 is a plan view or horizontal section of the arrangement shown in FIG. 5, FIG. 7 shows on a still larger scale details of a discharge conveyor for the objects, in side view and cross-section, FIG. 8 shows similarly to FIG. 1 a second example of construction of the apparatus.

The apparatus shown in the drawings consists of the following main components: feed conveyor 10, separating unit 11, discharge conveyor 12, and transfer conveyor 13.

On the feed conveyor 10, which is in the form of a belt, elongated, right parallelepipedic objects 14 are fed in a continuous, uninterrupted row 15. The objects 14 are preferably elongated packages, in particular cigarette cartons, which are delivered in a determined formation to another packing machine for the purpose of assembly into larger bundles. The objects 14 are transported, with their longitudinal axes pointing in the conveying direction, in a feed conveying direction 16. For this purpose the objects 14 of the row 15 are separated from the row 15 by the separating unit 11, and then further transported by the discharge conveyor 12 in the direction transverse to the longitudinal axis of the objects 14 (discharge conveying direction 17).

To this end the object 14a lying at the front in the conveying direction is separated by the separating unit 11 by transverse displacement (in a horizontal plane), from the following row 15, and fed to the discharge conveyor 12 while continuing the movement in the feed conveying direction 16. The sideward movement of the objects 14 in the region of the separating unit 11 takes place in the present case on a plate-shaped support 59. The continuous, uninterrupted transport of the row 15 is not interrupted, but only temporarily delayed, during this separation operation.

The separating unit 11 consists in the preferred embodiment shown in FIGS. 1 to 7 of a transverse pusher conveyor 18, and the latter consists of two pusher belts 19 and 20 spaced apart and extending parallel to one another. The pusher belts 19 and 20, preferably cogged belts, each run over coaxial guide wheels 21 and 22. The pusher belts 19, 20 are disposed in upright planes above the plane of movement of the objects 14.

The transverse pusher conveyor 18 serves for the continuous rotary transport of transverse pushers 23, each of which is brought to bear against an object 14 and then displaces the latter transversely. For this purpose, in the present example of embodiment, each transverse pusher 23 consists of two pusher jaws 24 and 25, which are spaced apart from the one another and which always conjointly come to bear against a longitudinally extending side surface 26 of an object.

The transverse pushers 23 are connected indirectly to the pusher belts 19, 20 by means of transversely disposed carrier rods 27 connecting the pusher belts 19 and 20 together. Two successive carrier rods 27 are associated with each transverse pusher 23 formed in the manner described above. Each pusher jaw 24 and 25 is mounted on a separate carrier rod 27 with the aid of an elongated tubular sliding contact bearing 28,29. To permit transverse movements of the transverse pushers 23 (for the transverse displacement of an object 14), the respective transverse pusher 23 or pusher jaws 24,25 are moved on the carrier rods 27 transversely to the feed conveying direction 16.

The pusher jaws 24 and 25 of a transverse pusher 23 are coupled together by a connecting arm 30. The latter is fastened on the rear pusher jaw 24 (referring to the direction of conveyance) and joined by a joint 31 to the front pusher jaw 25. The pusher jaws 24 and 25 can thus be displaced transversely as a unit. In the region of the guide wheels 21, 22, the joint 31 permits reversal without forcing.

In the present embodiment, the transverse pushers 23 used are those running in the region of a lower side 32 of the transverse pusher conveyor. In the region of the guide wheels 21 the transverse pushers 23 are moved from above towards the object 14a which is at the front at the moment in question. After the reversal has been made, that is to say after the horizontal position has been reached, the pusher jaws 24, 25 bear against the side surface 26 of the object 14a. The transverse displacement of this object 14a then commences. For this purpose the transverse pusher 23 is controlled by a guide member. In the embodiment illustrated, a stationary slotted guide plate 33 is provided above the path of movement of the transverse pushers 23, this guide plate being provided with a guide slot 34 which is open at the bottom and which extends substantially in the feed conveying direction. A guide member joined to the transverse pusher 23, namely a guide pin 35 which is expediently provided with a roller, engages from below in this guide slot. The shape of the guide slot 34 accordingly determines the path of movement of the transverse pusher 23. As can be seen in particular in FIG. 6, the transverse pusher 23 makes an approximately Z-shaped movement corresponding to the path line 36 of the guide pin 35. The end portion of this path line 36, like the starting portion, points in a direction parallel to the feed conveying direction 16 and is offset in such a manner that the respective object 14b can be received by the discharging conveyor 12.

The transverse pusher 23 is moved upwards out of the path of movement of the object 14b, as the movement of the transverse pusher conveyor 18 continues, through the reversal in the region of the guide wheels 22. The rear side 37 of the transverse pusher 23 (pusher jaw 24) is provided with a top bevel 38, which enables the transverse pusher 23 to be lifted away, without forcing, in relation to the following object 14a.

In the region of an upper side 39 of the transverse pusher conveyor 18 another slotted guide plate 40 is provided, which brings about the return movement of the transverse pushers 23 to the starting position, similarly to the operation described in connection with the slotted guide plate 33.

The rear side 37 of the transverse pushers 23 is at the same time a stop or check surface for the following objects 14 in the row 15. As can be seen in particular in FIG. 6, the transverse pushers 23 are in each case moved towards the side surface 26 of the respective object 14a with offsetting in the feed conveying direction 16. The distance between the rear side 37 and the rear end face of the object 14a amounts for example to 20 mm. Transverse pusher conveyor 18 moves at a slower speed than that of feed conveyor (10) such that during the following conveying movement this difference is cancelled by the higher speed of movement of the objects 14, so that in consequence of the lateral offsetting effected in the meantime the object 14c, which is now at the front of the row 15, runs onto the rear side 37 of the transverse pusher 23. During the next phase the row 15 is moved on at a lower speed, namely at the speed of the transverse pushers 23, until the respective transverse pusher comes out of engagement at the end of a corresponding work cycle.

In order to ensure accurate guiding of the objects 14 during the transverse movement, each transverse pusher 23 has associated with it a side holder 41 which takes hold of the object of the side surface 42 opposite to the side surface 26, and secures it. The side holder 41 is angular in shape and is joined to the pusher jaw 25 lying at the front in the direction of conveyance (by the sliding contact bearing 29). A downwardly pointing arm takes hold of the object 14 in the manner described when the transvese pusher 23 is moved by the transverse pusher conveyor 18 against the object from above.

The transfer of the (transversely displaced) objects 14 to the discharge conveyor 12 is effected in the region of a reversal point of the latter. The discharge conveyor consists here of two conveyor belts 44 and 45 running at a distance from one another. On their side facing outwards these belts are provided with web-like drivers 46, which in each case conjointly take hold of an object in the region of the side face 26, and carry it away. The conveyor belts 44, 45 run, in the region of the (upper) reversal point, over a guide drum 47 in the region of which the transfer of the objects takes place. The guide drum 47 is likewise provided centrally, that is to say between the conveyor belts 44 and 45, with drivers 48, which lie in the same plane as the drivers 46 and exert an additional driving action. The respective object 14 is pushed onto the guide drum 47 in the axial direction of the drum until it bears against a stop determining the relative position on the guide drum 47. This stop is here formed by a circumferential disc-like collar 49, projecting in the radial direction, on the guide drum 47. The object lying at the front at the moment in question is advanced until it bears against this collar 49 and is then driven by the discharge conveyor 12. The object is conveyed as far as this position by the kinetic energy resulting from the high speeds. In order to prevent the object from springing back, since in some cases it strikes against the collar 49 at high speed, a holding means 50 is provided, which is in the form of an arm adapted to pivot to-and-fro and to move from a starting position (broken lines in FIG. 5) to the retaining position (solid lines), following the object in question. In cases where this is not sufficient, because of reduced speed, to move the object into the required end position, the holding means 50 also takes over the function of a conveyor means in order to ensure that the object 14 is moved until it lies against the collar 49.

The objects 14 are conveyed in the downward direction by the discharge conveyor 12 to the plane of the transfer conveyor 13. In order to ensure adequate guidance of the objects during this downward movement, upright side guide bars or strips 51 are provided, preferably having an angular profile. These guide bars align the object in contact with drives 46 on the conveyor belts 44, 45. At the bottom end of the discharge conveyor 12, in the region of a second guide drum 52, the guide bars 51 cooperate with a curved outlet 53 for the objects 14, so that the latter are already oriented in the conveying direction of the transfer conveyor 13 when they are deposited on the latter.

As can be seen from FIG. 2, the separating unit 11 is disposed as an independently movable unit above the path of movement of the objects 14. The side of the separating unit 11 which is associated with the discharge conveyor 12 is pivotally mounted in the region of a shaft 54 of the guide wheels 22. With the aid of lateral pressure medium cylinders 55 the entire separating unit 11 can be pivoted into an upwardly inclined position (FIG. 2), for example for the purpose of eliminating faults.

An alternative form of construction for the separating unit 11 is shown diagrammatically in FIG. 8. Here transverse pushers 56 in the form of individual webs are disposed directly on the outside of a transverse pusher belt 57. The latter is disposed obliquely in relation to the direction of movement of the objects 14 (at an acute angle to the feed conveying direction 16). The transverse pushers 56 are disposed relative to one another on the transverse pusher belt 57 in such a manner that they act on the side face 26 of the objects 14 and, in consequence of the inclined position of the transverse pusher belt 57, when the conveying movement is continued they push the objects transversely and separate them from the following objects in the row 15.

In this embodiment also each transverse pusher 56 has associated with it a stop in the form of a transverse web 58 on the transverse pusher belt 57. The row 15, or rather the front object in the row at any given moment, runs against the rear face of this transverse web 58 when the preceding object has been pushed away to the side.

Otherwise this device is constructed substantially in the same way as the previously described embodiment.

We claim:

1. In an apparatus for separating front objects one at a time from a row of objects fed in a densely packed row of end-to-end abutting objects, particularly packages such as cigarette cartons, by transversely pushing away at least the front object of said row, one at a time, said apparatus comprising: a feed conveyor bearing said row of objects, a transverse pusher conveyor moving generally parallel to said feed conveyor bearing said row of objects, transverse pushers provided on said transverse pusher conveyor which grasp an object laterally and, as the conveying continues, push it away, transverse to the feed conveying direction of said objects, the improvement comprising:

means for moving said transverse pushers (23, 56) relative to said feed conveyor (10) at a speed lower than the speed of movement of said feed conveyor (10) and means for moving said transverse pushers (23, 56) lengthwise along an essentially linear conveying path transverse to the feed conveying direction (16) at least during the pusher motion.

a discharge covenyor (12) mounted laterally to one side of the feed conveyor (10) on the discharge side of the transverse pushers (23, 56) and in the path of movement of the objects leaving the feed conveyor (10), and a stop (49) provided on the discharge conveyor (12) to the side remote from said feed conveyor and said transverse pushers for limiting the movement of objects (14) in their longitudinal direction of movement onto said discharge conveyor.

2. The apparatus according to claim 1, wherein transverse pushers (23, 56) are mounted on a rotating transverse pusher conveyor (18) for circulation about a path having portions in which they travel parallel to said feed conveyor.

3. The apparatus according to claim 1, wherein said apparatus further comprises means for shifting said transverse pushers in a lateral direction to the direction of movement of said transverse pusher conveyor (18).

4. The apparatus according to claim 3, wherein said transverse pusher conveyor (18) moves in a plane parallel to the feed conveying direction with said transverse pushers moving in a direction lateral to the direction of movement of the transverse pusher conveyor (18).

5. The apparatus according to claim 4, wherein the transverse pusher conveyor (18) consists of two rotating pusher belts (19, 20) spaced laterally apart from each other on opposite sides of the path of movement of said objects (14), said apparatus further comprises carrier rods (27) laterally connecting said pusher belts together, and wherein each transverse pusher is mounted on at least one carrier rod (27) for sliding movement thereon transverse to the direction of movement of said transverse pusher conveyor (18).

6. The apparatus according to claim 4, further comprising a stationary guide member (33) in juxtaposition to the path of movement of said transverse pushers (23) and operatively engaging said transverse pushers for controlling transverse movement of said transverse pushers as said transverse pushers move longitudinally in the direction of the transverse pusher conveyor carrying the same.

7. The apparatus according to claim 6, wherein said stationary guide member comprises a guide plate (33) having a guide slot (34), and wherein said transverse pushers (23) include a guide pin mounted thereto and located so as to project within said guide slot (34).

8. The apparatus according to claim 1, wherein each transverse pusher consists of several pusher jaws (24, 25) separate from each other, slidably mounted on separate carrier rods in side-by-side fashion for simultaneous operation.

9. The apparatus according to claim 8, further comprising a connecting arm forming a joint (31) connecting said pusher jaws (24, 25) of said transverse pusher together.

10. The apparatus according to claim 1, further comprising a side holder (41) operatively associated with each transverse pusher (23) in the zone of transfer of an object (14) from said feed conveyor to said discharge conveyor and located to the side of said transverse pusher conveyor (18) opposite that of said transverse pusher (23) relative to the path of movement of objects (14) borne by the feed coneyor for grasping an object (14) on the side opposite from that of said transverse pusher (23) to facilitate transfer of the objects from the feed conveyor to the discharge conveyor.

11. The apparatus according to claim 10, wherein said side holder (41) is angular, and said apparatus comprises an arm (43) connecting said holder (41) to a transverse pusher (23) such that the side holder is moved over the object (14) from above to permit the side holder to grasp the object (14).

12. The apparatus according to claim 1, wherein said discharge conveyor (12) comprises a belt conveyor consisting of two conveyor belts (44, 45), and wherein said discharge conveyor further comprises drivers (46) spaced laterally apart from each other and mounted to respective conveyor belts (44, 45) and forming multiple pairs of drivers, with said drivers (46) being longitudinally spaced apart from each other along said conveyor belts at distances approximating the width of the object (14) received thereby.

13. The apparatus according to claim 12, wherein said discharge conveyor (12) is oriented vertically and includes a guide drum having an end racing said feed conveyor, and wherein said discharge conveyor receives said objects which are transferred thereto between adjacent sets of said drivers as said two conveyor belts (44, 45) rotate about the periphery of said guide drum (47), and wherein said conveyor belts (44, 45) move vertically downwardly away from the discharge conveyor guide drum carrying said objects along a vertically downward path.

14. The apparatus according to claim 12, wherein said discharge conveyor (12) includes upper and lower guide drums bearing said two conveyor belts (44, 45) and wherein the objects (14) are fed onto the discharge conveyor from the side thereof facing the feed conveyor in a direction parallel to the axis of the upper guide drum (47).

15. The apparatus according to claim 14 wherein the stop limiting the longitudinal movement of objects onto said discharge conveyor to the side opposite that proximate to said transverse pushers, constitutes a radially projecting collar (49) on the edge of the guide drum (47).

16. The apparatus according to claim 15, further comprising holding means (50) provided in the area of transfer of objects (14) from the feed conveyor to the discharge conveyor (12), and means for supporting said holding means (50) and for causing said holding means (50) to follow the object (14) in the feed conveying direction (16) and to fix the position of the object (14) on the discharge conveyor (12) between the holding means and said radially projecting collar (49), such that said objects are aligned on the discharge conveyor (12) for subsequent movement on said conveyor.

17. The apparatus according to claim 1, further comprising means for moving said transverse pusher conveyor (18) and said transverse pushers (23) as a unit vertically up and down relative to said feed conveyor to alternatively place said transverse pushers in and out of position to effect transfer of objects carried by said feed conveyor to said discharge conveyor.

18. The apparatus according to claim 17, further comprising means for pivotably moving said transverse pusher conveyor (18) and said transverse pushers (23) as a unit.

* * * * *